United States Patent
Wiegman

(10) Patent No.: US 12,253,385 B2
(45) Date of Patent: *Mar. 18, 2025

(54) METHODS AND SYSTEMS FOR FIXED WING FLIGHT TO VERTICAL WING FLIGHT FOR LANDING AN AIRCRAFT

(71) Applicant: BETA AIR, LLC, South Burlington, VT (US)

(72) Inventor: Herman Wiegman, Essex Junction, VT (US)

(73) Assignee: BETA AIR LLC, South Burlington, VT (US)

( * ) Notice: Subject to any disclaimer, the term of this patent is extended or adjusted under 35 U.S.C. 154(b) by 227 days.

This patent is subject to a terminal disclaimer.

(21) Appl. No.: 17/874,624

(22) Filed: Jul. 27, 2022

(65) Prior Publication Data
US 2023/0089658 A1    Mar. 23, 2023

Related U.S. Application Data

(63) Continuation-in-part of application No. 17/480,231, filed on Sep. 21, 2021, now Pat. No. 11,440,678.

(51) Int. Cl.
*G06F 17/00* (2019.01)
*B64D 45/04* (2006.01)
(Continued)

(52) U.S. Cl.
CPC .......... *G01C 23/005* (2013.01); *B64D 45/04* (2013.01); *B64C 29/0008* (2013.01); *B64C 39/024* (2013.01)

(58) Field of Classification Search
CPC ...... G01C 23/005; B64D 45/04; B64D 27/24; B64C 29/0008; B64C 39/024;
(Continued)

(56) References Cited

U.S. PATENT DOCUMENTS 6,293,491 B1    9/2001    Wobben
7,267,300 B2    9/2007    Heath et al.
(Continued)

FOREIGN PATENT DOCUMENTS

WO    WO-2020252024 A1 * 12/2020 ............. G01C 21/20

OTHER PUBLICATIONS

Landing, electric aircraft, descend, display pilot, inputs, radar, gps, buffer, training, teaching, machine-learning (Year: 2024).*
(Continued)

*Primary Examiner* — Ronnie M Mancho
(74) *Attorney, Agent, or Firm* — Lee & Hayes, P.C.

(57) ABSTRACT

A system and method for landing an electric aircraft is provided. The system includes a controller, wherein the controller is communicatively connected to the sensor, wherein the controller is configured to, receive a plurality of measured flight data, determine a descent confirmation as a function of the plurality of measured flight data, generate a descent instruction set as a function of the descent confirmation and the plurality of measured flight data, wherein generating the descent instruction set further includes generating a transition instruction set, and transmit the descent instruction set to a plurality of flight components, wherein each flight component of the plurality of flight components are coupled to the electric aircraft.

20 Claims, 10 Drawing Sheets

(51) Int. Cl.
*G01C 23/00* (2006.01)
*B64C 29/00* (2006.01)
*B64C 39/02* (2023.01)

(58) Field of Classification Search
CPC ...... B64C 29/0025; G06N 20/00; G06N 7/02; G08G 5/0091; G08G 5/045; G08G 5/0021; G08G 5/025
USPC .......................................................... 701/16
See application file for complete search history.

(56) References Cited

U.S. PATENT DOCUMENTS

| | | | |
|---|---|---|---|
| 8,540,183 B2 | 9/2013 | Morris et al. | |
| 9,096,314 B2 | 8/2015 | Brotherton-Ratcliffe et al. | |
| 9,242,728 B2 | 1/2016 | Morrison | |
| 9,561,860 B2* | 2/2017 | Knapp | B64C 11/44 |
| 9,645,582 B2* | 5/2017 | Shue | G05D 1/0676 |
| 9,845,150 B2 | 12/2017 | Kroo | |
| 9,994,313 B2 | 6/2018 | Claridge et al. | |
| 10,144,509 B2 | 12/2018 | Cruz Ayoroa | |
| 10,272,995 B2 | 4/2019 | Leng | |
| 10,501,194 B2* | 12/2019 | Knapp | B64C 11/44 |
| 10,535,272 B2* | 1/2020 | Groden | G05D 1/227 |
| 10,752,372 B2 | 8/2020 | Senkel et al. | |
| 10,816,970 B2* | 10/2020 | Bosworth | G05D 1/0676 |
| 10,854,092 B1* | 12/2020 | Subramaniyan | G08G 5/0052 |
| 10,926,874 B2 | 2/2021 | Giannini et al. | |
| 10,960,975 B1* | 3/2021 | Villa | G08G 5/0026 |
| 10,994,838 B2 | 5/2021 | Delorean | |
| 11,104,444 B2* | 8/2021 | Knapp | B64D 27/24 |
| 2013/0134264 A1 | 5/2013 | Carter, Jr. et al. | |
| 2016/0236790 A1* | 8/2016 | Knapp | B64C 11/44 |
| 2016/0257415 A1* | 9/2016 | Ye | B64D 25/20 |
| 2018/0134400 A1* | 5/2018 | Knapp | G01C 21/20 |
| 2018/0364707 A1* | 12/2018 | Bosworth | B64D 45/0056 |
| 2019/0033862 A1* | 1/2019 | Groden | G05D 1/0088 |
| 2019/0221127 A1* | 7/2019 | Shannon | G08G 5/0026 |
| 2019/0291862 A1 | 9/2019 | Lyasoff et al. | |
| 2019/0329868 A1 | 10/2019 | Morrison | |
| 2019/0340933 A1* | 11/2019 | Villa | G06Q 10/047 |
| 2019/0340934 A1* | 11/2019 | Villa | G08G 5/003 |
| 2020/0290742 A1* | 9/2020 | Kumar | B64D 27/24 |
| 2020/0346769 A1* | 11/2020 | Knapp | G08G 5/0034 |
| 2020/0369391 A1* | 11/2020 | Sloman | B64D 27/023 |
| 2021/0082295 A1* | 3/2021 | Surace | G08G 5/0073 |
| 2021/0109547 A1* | 4/2021 | Clark | G05D 1/0816 |
| 2021/0150919 A1 | 5/2021 | Schaferlein | |
| 2021/0206276 A1* | 7/2021 | Wiegman | H02J 4/00 |
| 2021/0287555 A1* | 9/2021 | Villa | G06Q 10/047 |
| 2021/0339882 A1* | 11/2021 | Ferrier | B64C 29/0016 |
| 2021/0380224 A1* | 12/2021 | Clark | B64C 13/50 |
| 2022/0011782 A1* | 1/2022 | Mikic | B64C 29/0033 |

OTHER PUBLICATIONS

Xichen Shi, Intelligent Control for Fixed-Wing eVTOL Aircraft, Dec. 31, 2021.
Ferit, Cakici; Kemal, Leblebicioglu, Control System Design of a Vertical Take-off and Landing Fixed-Wing UAV, Aug. 9, 2016.

* cited by examiner

METHODS AND SYSTEMS FOR FIXED WING FLIGHT TO VERTICAL WING FLIGHT FOR LANDING AN AIRCRAFT

CROSS-REFERENCE TO RELATED APPLICATIONS

This application is a continuation-in-part of Non-provisional application Ser. No. 17/480,231 filed on Sep. 21, 2021 and entitled "SYSTEMS AND METHODS FOR FIXED WING FLIGHT TO VERTICAL WING FLIGHT FOR LANDING FOR AN AIRCRAFT" the entirety of which is incorporated herein by reference.

FIELD OF THE INVENTION

The present invention generally relates to the field of aircraft landing. In particular, the present invention is directed to systems and methods for fixed wing flight to vertical wing flight for landing an aircraft.

BACKGROUND

As an aircraft approaches its destination, the aircraft may require significant consumption of power and turbulence when landing at its destination. The procedures for descending onto a location requires careful management of power and torque to achieve a safe and efficient mode of landing. Traditional technologies may be complex and pose a considerable amount of variability in the experience of a descent which may further pose greater risk to human error or harm.

SUMMARY OF THE DISCLOSURE

In an aspect a system for landing an electric aircraft is provided. The system includes a controller, wherein the controller is communicatively connected to the sensor, wherein the controller is configured to, receive a plurality of measured flight data, determine a descent confirmation as a function of the plurality of measured flight data, generate a descent instruction set as a function of the descent confirmation and the plurality of measured flight data, wherein generating the descent instruction set further includes generating a transition instruction set, and transmit the descent instruction set to a plurality of flight components, wherein each flight component of the plurality of flight components are coupled to the electric aircraft.

In another aspect a method for landing an aircraft, the method receiving, by a controller, a measured flight datum, determining a descent confirmation as a function of the plurality of measured flight data, generating a descent instruction set as a function of the descent confirmation and the plurality of measured flight data, wherein generating the descent instruction set further includes generating a transition instruction set, and transmitting the descent instruction set to a plurality of flight components, wherein each flight component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
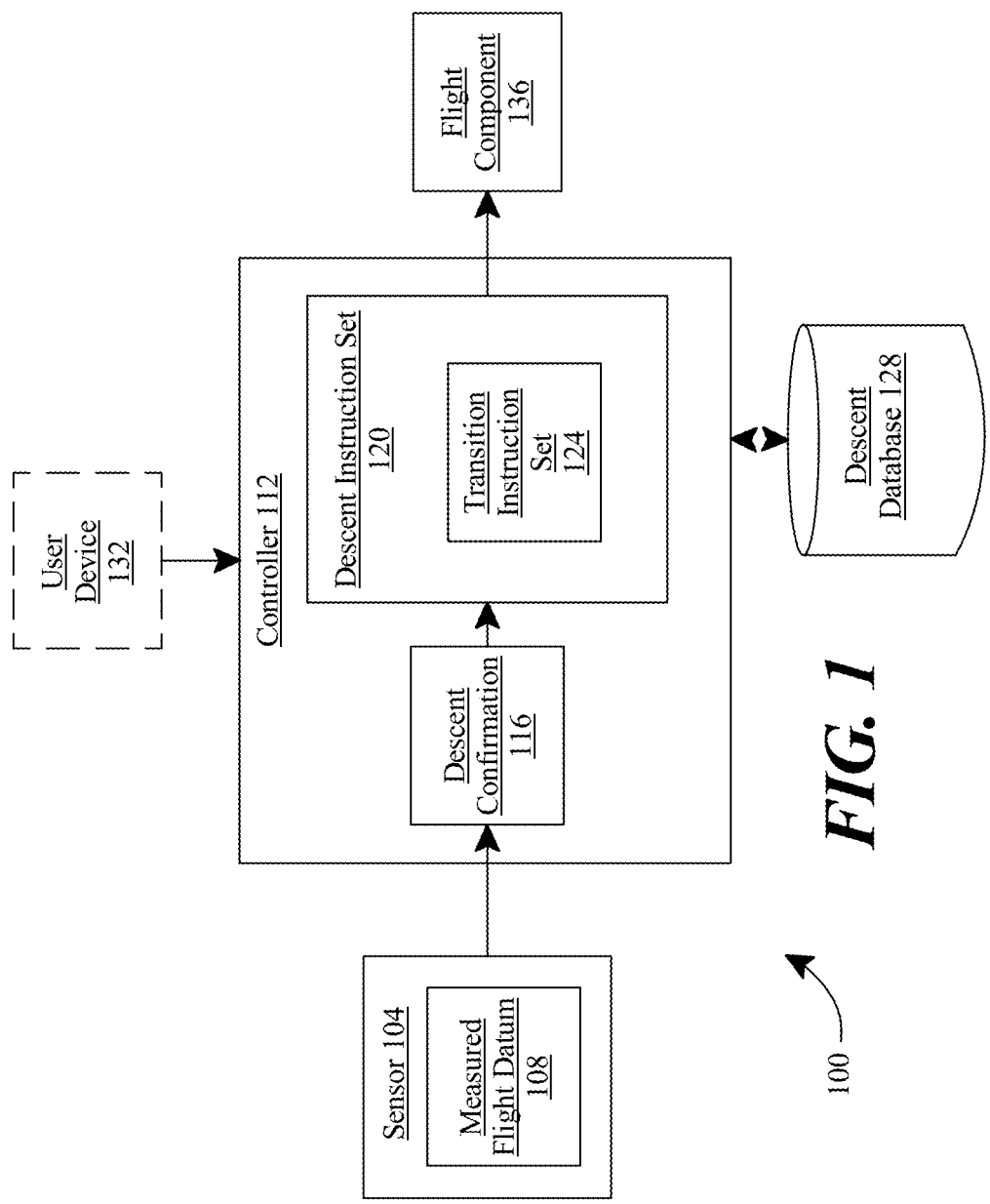
FIG. 1 is a block diagram of an exemplary embodiment of a system for fixed wing flight to vertical wing flight for landing an aircraft.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for fixed wing flight to vertical wing flight for landing an aircraft. In an embodiment, the present disclosure may be used for electric aircrafts. Aspects of the present disclosure can be used to land an electric vertical and take-off (eVTOL) aircraft safely, efficiently, and optimally.

Aspects of the present disclosure can be used to land an aircraft while conserving as much battery during the process. Aspects of the present disclosure can also be used to conserve the performance output of an aircraft's actuators. This is so, at least in part, because aspects of the present disclosure can be used to generate a set of instructions or commands that serve to properly land an aircraft with multiple considerations such as battery capacity, power surge, level of smooth landing, and the like thereof. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to embodiments oriented as shown for exemplary purposes in FIG. 6. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a block diagram of an exemplary embodiment of a system 100 for fixed wing flight to vertical wing flight for landing an aircraft is illustrated. Aircraft may include, but not limited to, an electric aircraft, an electric vertical take-off and landing (eVTOL) aircraft, an unmanned aerial vehicle (UAV), a drone, and the like thereof. System 100 includes a controller 112, wherein the controller is communicatively coupled to a sensor 104. "Communicatively connected", for the purposes of this disclosure, is two or more components electrically, or otherwise connected and configured to transmit and receive signals from one another. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sine function, or pulse width modulated signal. A "sensor," for the purposes of this disclosure, is an electronic device configured to detect, capture, measure, or combination thereof, a plurality of external and electric vehicle component quantities. Sensor 104 may be integrated and/or connected to at least an actuator, a portion thereof, or any subcomponent thereof. Sensor 104 may include a photodiode configured to convert light, heat, electromagnetic elements, and the like thereof, into electrical current for further analysis and/or manipulation. Sensor 104 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sine function, or pulse width modulated signal. A plurality of datum captured by sensor 104 may include circuitry, computing devices, electronic components or a combination thereof that translates into at least an electronic signal configured to be transmitted to another electronic component.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from the sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may target an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, sensor 104 may be configured to detect a measured flight datum 108. A "measured flight datum," for the purpose of this disclosure, is any datum or element of data describing the physical or environmental parameters of an aircraft and the outside environment. In a non-limiting embodiment, measured flight datum may include, but not limited to, temperature, wind speed, altitude, flight time, remaining flight time, air pressure, power output, remaining battery capacity, number of cargo and/or personnel, aircraft velocity, aircraft actuator torque output, and the like thereof. Measured flight datum 108 may include a plurality of pilot inputs. A "pilot input," for the purpose of this disclosure, is an action or command performed by a pilot of an aircraft or an element of data identifying a pilot command. Pilot input may include a manual input, wherein the manual input may include a plurality of commands configured to directly control a plurality of flight components of an aircraft. In a non-limiting embodiment, pilot input may include at least a pilot control. The at least a pilot control may be communicatively connected to any other component presented in system, the communicative connection may include redundant connections configured to safeguard against single-point failure. In a non-limiting embodiment, pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch", for the purposes of this disclosure is an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, is an aircraft's position about its longitudinal axis, that is to say that when an aircraft rotates about its axis from its tail to its nose, and one side rolls upward, like in a banking maneuver. "Yaw", for the purposes of this disclosure, is an aircraft's turn angle, when an aircraft rotates about an imaginary vertical axis intersecting the center of the earth and the fuselage of the aircraft. "Throttle", for the purposes of this disclosure, is an aircraft outputting an amount of thrust from a propulsor. Pilot input, when referring to throttle, may refer to a pilot's desire to increase or decrease thrust produced by at least a propulsor. Sensor 104 may be configured to detect pilot input from at least a pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

With continued reference to FIG. 1, sensor 104 may include circuitry, computing devices, electronic components or a combination thereof that translates pilot input into a measured flight datum 108 of a plurality of measured flight data configured to be transmitted to any other electronic component. Any pilot input as described herein may be consistent with any pilot input as described in U.S. patent application Ser. No. 17/218,387 and titled, "METHOD AND SYSTEM FOR FLY-BY-WIRE FLIGHT CONTROL CONFIGURED FOR USE IN ELECTRIC AIRCRAFT," which is incorporated herein in its entirety by reference. Pilot input may include a pilot control which may include a throttle wherein the throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929,206 and titled, "A HOVER AND THRUST CONTROL ASSEMBLY FOR DUAL-MODE AIRCRAFT", which is incorporated herein in its entirety by reference. Sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Any inceptor stick described herein may be consistent with any inceptor or directional control as described in U.S. patent application Ser. No. 17/001,845 and titled, "A HOVER AND THRUST CONTROL ASSEMBLY FOR DUAL-MODE AIRCRAFT", which is incorporated herein in its entirety by reference. At least an input datum 108 may include a manipulation of one or more pilot input controls as described above that correspond to a desire to affect an aircraft's trajectory as a function of the movement of one or more flight components and one or more actuators, alone or in combination.

With continued reference to FIG. 1, the plurality of measured flight data 108 is configured to be received by a controller 112. Controller 112 may include a flight controller. In a non-limiting embodiment, Controller 112 may include a computing device. computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device may include but is not limited to, for example, a computing device or cluster of computing devices in a first location and a second computing device or cluster of computing devices in a second location. computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, controller 112 may receive the plurality of as a function of a physical controller area network (CAN) bus unit. A physical CAN bus unit may be communicatively connected to the sensor 104 and controller 112. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks. For instance and without limitation, CAN bus unit may be consistent with disclosure of CAN bus unit in U.S. patent application Ser. No. 17/218,342 and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, the controller 112 may receive the plurality of measured flight data 108 from the sensor 104 by a physical CAN bus unit. In a non-limiting embodiment, the sensor 104 may include a physical CAN bus unit to detect the plurality of measured flight data 108 in tandem with a plurality of individual sensors from a sensor suite. Physical CAN bus unit may include multiplex electrical wiring for transmission of multiplexed signaling. Physical CAN bus unit 104 may include message-based protocol(s), wherein the invoking program sends a message to a process and relies on that process and its supporting infrastructure to then select and run appropriate programing. A plurality of physical CAN bus units may be located physically at the aircraft may include mechanical connection to the aircraft, wherein the hardware of the physical CAN bus unit is integrated within the infrastructure of the aircraft. Persons skilled in the art, upon reviewing the entirety of this disclosure, will be aware of various network methodologies in receiving and transmitting data as described in the entirety of this disclosure.

With continued reference to FIG. 1, controller 112 is configured to determine a descent confirmation 116 as a function of the plurality of measured flight data 108. A "descent confirmation," for the purpose of this disclosure, is a Boolean determination performed by a controller 112 in which a confirmation may be determined at an instance of an aircraft ready to descent onto a landing location. In a non-limiting embodiment, controller 112 may be configured to consistently determine the descent confirmation 116 in time intervals throughout a duration of a flight. For example and without limitation, controller 112 may automatically check if the aircraft is nearing its approach to a landing location and perform a check to produce the descent confirmation 116 as a function of the measured flight datum 108. For example and without limitation, a controller 112 may confirm a point in flight to be the point of beginning a descent to a landing location but may modify its determination of the decent confirmation 116 based on external factors such as, but not limited to, weather, wind speed, air traffic, air traffic control (ATC) authority, environmental obstacles and/or hazards, and/or combination thereof. In a non-limiting embodiment, controller 112 may determine the descent confirmation in consistent intervals but may increase the frequency of the determination after completing the first half of the aircraft's flight. In a non-limiting embodiment, descent confirmation 116 may be determined as a function of a manual input or manual pilot input by a pilot of the aircraft. In a non-limiting embodiment, descent confirmation 116 may be determined as a function of a descent threshold. Descent threshold may include a buffer zone in which the buffer zone represents an optimal frame of flight for the aircraft to begin descending onto a landing location. Descent threshold may include an upper limit and a lower limit defining the parameters of the buffer zone. Persons skilled in the art, upon reviewing the entirety of this disclosure, will be aware of the embodiment of a buffer zone as described in the entirety of this disclosure.

With continued reference to FIG. 1, controller 112 is configured to generate a descent instruction set 120 as a function of the descent confirmation 116 and the plurality of measured flight data 108. A "descent instruction set," for the purpose of this disclosure, is a set of commands or instructions an aircraft is designed and configured to follow to land on a landing location. In a non-limiting embodiment, descent instruction set 120 may include a plurality of actuator commands that may be generated automatically wherein the plurality of actuator commands may be modified and altered as a function of the measured flight datum 108 and/or manual pilot input. In a non-limiting embodiment, controller 120 may be configured to perform the descent instruction set 120 automatically at the positive determination of the descent confirmation 116 and land the aircraft. In a non-limiting embodiment, controller 112 may generate the descent instruction set 120 in which the descent instruction set 120 is configured to be followed and commanded manually by an aircraft pilot. Descent instruction set 120 may include a plurality of commands for acceleration and braking of aircraft actuators. In a non-limiting embodiment, descent instruction set 120 may include a plurality of unique commands assigned to each vertical propulsor of the aircraft and a forward propulsor of the aircraft. Descent instruction set 120 may include a beginning stage. A "beginning stage," for the purpose of this disclosure, is an initial phase of the aircraft descending onto a landing location. Beginning stage may include a distance above the surface the aircraft should maintain to initiate the descent. Beginning stage may include a minimum and maximum speed the aircraft may command in the initiation of the descent. Beginning stage may include a distance the aircraft is required to cover to achieve a proper descent. For example and without limitation, controller 112 may generate the distance required for descent using a formula and a function of a supervised machine-learning algorithm. In a non-limiting embodiment, beginning stage may include distance required for the aircraft to cover in its descent to be three times the height of the aircraft wherein the height includes the distance from the aircraft perpendicular to the surface. For example and without limitation, height may include a height of 1,500 feet and the distance the aircraft is required to have to properly descent may include a height of roughly 4,500 feet. In a non-limiting embodiment, the general formula for calculating the distance required in the beginning stage may include considerations of, but not limited to, tailwind, induced drag, and the like thereof. For example and without limitation, tailwind during the beginning stage may include speeds of 5 knots to 20 knots and add several hundred feet to the distance required. Beginning stage may include an angle of attack the aircraft must command in the initial phase of a descent. For example and without limitation, aircraft may be instructed to dive at an angle 30 degrees and hold a constant speed of 70 miles per hour until it reaches a following stage of descent. In a non-limiting embodiment, in the beginning stage of descent, controller 112 may instruct the aircraft to dive or to approach at a stabilized speed and descent angle with low, none, or negative power consumption. Beginning stage may include the aircraft to be angled towards ground. The aircraft may utilize minimal amounts of power in the beginning stage of descent. In some embodiments, a plurality of actuators may be capable of substantially more power over very short time periods, possibly up to double of steady-state power for a few seconds. In the beginning stage of descent, descent through blown windborne flight may be used to reduce motor load during the initial transition from forward flight to hover to reduce the time and the initial heating of the power system prior to the final use of power at extremely low speeds. For example, a vehicle may use half of hover power to generate lift at a 7 m/s forward flight speed. Persons skilled in the art, upon reviewing the entirety of this disclosure, will be aware of the various configurations of an aircraft in the context of initial phase of descent as described in the entirety of this disclosure.

With continued reference to FIG. 1, generating the descent instruction set 120 may include generating a transition instruction set 124. A "transition instruction set," for the purpose of this disclosure, is a plurality of actuator commands specifically for a set of vertical and forward propulsors of an aircraft for the transition of fixed-wing flight to vertical-wing flight in the landing of the aircraft. Transition instruction set may include a plurality of commands for the actuators of the aircraft. In a non-limiting embodiment, transition instruction set may include a plurality of commands instructing the vertical propulsors and forward propulsors to output torque in tandem to properly descend to a landing location. In a non-limiting embodiment, transition instruction may be subject to alterations based on new measured flight datum 108 and/or manual pilot inputs. In a non-limiting embodiment, transition instruction set may include a command that instructs the vertical propulsors to increase its torque output and lower its forward propulsor torque output, which may result in an increased angle of attack and the angle of the aircraft wings and/or nose. In a non-limiting embodiment, controller may perform a transition of a fixed-wing flight to vertical-wing flight as a function of the transition instruction set 124. "Torque," for the purposes of this disclosure, is a twisting force that tends to cause rotation. Torque is the rotational equivalent of linear force. In three dimensions, the torque may be a pseudovector; for point particles, it may be given by the cross product of the position vector (distance vector) and the force vector. The magnitude of torque of a rigid body depends on three quantities: the force applied, the lever arm vector connecting the point about which the torque may be being measured to the point of force application, and the angle between the force and lever arm vectors. A force applied perpendicularly to a lever multiplied by its distance from the lever's fulcrum (the length of the lever arm) may be its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque may be represented as a vector, consistent with this disclosure, and therefore includes a magnitude of force and a direction. Persons skilled in the art, upon reviewing the entirety of this disclosure, will be aware of the various torque outputs for the plurality of propulsors used in the context of transition from a fixed-wing flight to vertical-wing flight for landing an aircraft as described in the entirety of this disclosure.

With continued reference to FIG. 1, transition instruction set 124 may include each propulsor alternating its level of torque output to maintain a high angle of attack and speed of the aircraft to approach a landing location of the aircraft. In a non-limiting embodiment, transition instruction set 124 may include a plurality of commands for the vertical propulsors and forward propulsor to achieve an optimally efficient landing. Optimally efficient landing may include a landing in which power consumption is kept to a minimum without destabilizing the overall landing of the aircraft and transitioning of the aircraft from fixed-wing flight to vertical-wing flight. For example and without limitation, transition instruction set 124 may include a plurality of commands in which vertical propulsors and forward propulsor are activated mutually exclusively to avoid a high battery consumption as a result of all propulsors outputting torque at the same time continuously. For example and without limitation, plurality of commands may include short bursts of torque output to stabilize the aircraft in its descent.

With continued reference to FIG. 1, transition instruction set 124 may include a torque allocation. A "torque allocation," for the purpose of this disclosure, is an allocation of torque for the plurality of propulsors in which torque may be outputted. For example and without limitation, controller 112 may take in commands to alter aircraft trajectory that requires a change in pitch and yaw. Controller 112 allocate torque to at least one propulsor (or more) that do not independently alter pitch and yaw in combination to accomplish the command to change pitch and yaw. More than one propulsor may be required to adjust torques to accomplish the command to change pitch and yaw, mixer would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure. In a non-limiting embodiment, controller 112 may include a nonlinear program-based controller that may create new frequencies from two signals applied to it. In most applications, two signals are applied to mixer, and it produces new signals at the sum and difference of the original frequencies. Other frequency component may also be produced in a practical frequency mixer. One of ordinary skill in the art would understand that, in general, mixers are widely used to shift signals from one frequency range to another, a process known as heterodyning. Another form of torque allocation may be performed by switching, with the smaller input signal being passed inverted or noninverted according to the phase of the local oscillator (LO). This would be typical of the normal operating mode of a packaged double balanced mixer, with the local oscillator drive considerably higher than the signal amplitude. Torque allocation may be consistent with the description of torque allocation in U.S. patent application Ser. No. 17/197,427 and titled, "SYSTEM AND METHOD FOR FLIGHT CONTROL IN ELECTRIC AIRCRAFT", which is incorporated herein in its entirety by reference.

With continued reference to FIG. 1, transition instruction set 124 may include a forward propulsor torque command. Transition instruction set 124 may include a vertical propulsor torque command. A "forward propulsor torque command," is any torque allocation or torque allocation command for the forward propulsor of an aircraft. In a non-limiting embodiment, forward propulsor torque command may include a plurality of bursts of torque output for the forward propulsor. In a non-limiting embodiment, forward propulsor torque command may include a torque allocation of a decreasing torque output for the forward propulsor as it transitions from a fixed-wing flight to vertical-wing flight. A "vertical propulsor torque command," for the purpose of this disclosure, is any torque allocation or torque allocation command for the vertical propulsors of an aircraft. In a non-limiting embodiment, vertical propulsor torque command may include a plurality of bursts of torque output for the vertical propulsors. In a non-limiting embodiment, vertical propulsor torque command may include a torque allocation of an increasing torque output for the vertical propulsors as it transitions from a fixed-wing flight to vertical-wing flight. For example and without limitation, as the forward propulsor reduces its torque output, the vertical propulsors begin to increase its torque output. For example and without limitation, the aircraft may transition from a low angle of attack to a high angle of attack as a function of the vertical propulsor torque command and forward propulsor torque command. For example and without limitation, the aircraft may dive initially in which the wings and/or nose of the aircraft are angled at 30 degrees towards the surface and transition to 20 degrees towards the sky. Persons skilled in the art, upon reviewing the entirety of this disclosure, will be aware of the changing angles of attack in the context of landing as described in the entirety of this disclosure.

Further referring to FIG. 1, transition instruction set 124 and/or descent instruction set may be selected and/or generated as function of a measure of remaining energy. "Remaining energy," as used in this disclosure, is an amount of power and/or energy that one or more energy sources of an aircraft remain capable of providing for execution of flight maneuvers to be performed in executing a transition instruction set and/or descent instruction set. Remaining energy may include energy remaining in an electrical energy source such as a battery; such remaining electrical energy may be measured as a function of a state of charge of one or more batteries or other energy storage devices. Remaining energy may be calculated, without limitation, as described in U.S. Nonprovisional application Ser. No. 17/349,182, filed on Jun. 16, 2021, and entitled "SYSTEMS AND METHODS FOR IN-FLIGHT OPERATIONAL ASSESSMENT." Remaining energy may be used as a constraint in an optimization process such as use of an objective function as described below, as an input to a machine-learning model used to select and/or generate a transition instruction set and/or a descent instruction set, and/or as a criterion to filter potential descent instruction sets, transition instruction sets and/or flight maneuvers thereof; for instance, a potential descent instruction set, transition instruction set and/or flight maneuver may be eliminated because it requires an expenditure of energy that exceeds remaining energy and/or some proportion thereof, an objective function may be optimized according to a constraint that remaining energy and/or some proportion thereof may not be exceeded by a potential descent instruction set, transition instruction set and/or flight maneuver, or the like.

With continued reference to FIG. 1, transition instruction set 124 may be configured to solve at least an optimization problem, which may be an objective function. An "objective function," as used in this disclosure, is a mathematical function with a solution set including a plurality of data elements to be compared. Controller 112 may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; an objective function may be used by mixer to score each possible pairing. At least an optimization problem may be based on one or more objectives, as described below. Controller 112 may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted. Solving at least an optimization problem may include performing a greedy algorithm process, where optimization may be performed by minimizing and/or maximizing an output of objective function. A "greedy algorithm" is defined as an algorithm that selects locally optimal choices, which may or may not generate a globally optimal solution. For instance, controller 112 may select objectives so that scores associated therewith are the best score for each goal. For instance, in non-limiting illustrative example, optimization may determine the pitch moment associated with an output of at least a propulsor based on an input.

With continued reference to FIG. 1, controller 112 may be configured to generate a transition instruction set 124 as a function of the torque allocation. Controller 112 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component may be relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process may be then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this may be projecting the closest possible value for the third-level attitude command (roll in this example). This process would repeat again for the third and fourth attitude components, in this non-limiting example, roll and yaw attitude control components. Since roll may be prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, pitch axis may represent the command or plurality of attitude commands inputted to controller 112 as described herein, such as moment datum 140. Pitch axis may be conditioned or altered to be inputted to controller 112. For example, and without limitation, initial vehicle torque signal may include pitch and lift commands within plurality of attitude commands. Controller 112 may also receive at least a moment datum, which may be represented without limitation by a box plotted within the pitch and lift axes. A point where pitch command and lift command intersect may represent initial vehicle torque signal as projected onto exemplary graph of pitch and lift axes, which may be the same or similar to initial vehicle torque signal as disclosed in the entirety of this disclosure. Controller 112 utilizes prioritization data as described in the entirety of this disclosure to solve this two-dimensional problem by preserving the higher priority command and sacrificing the lower priority command. This prioritization preservation process may be illustrated, as a non-limiting example by placement of a modified attitude command, wherein the pitch command was preserved (horizontally translated and therefore unchanged from the initial command), while the lift command was lessened to bring the modified attitude command within vehicle torque limits (the box). The modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. The remaining vehicle torque may be displayed to a pilot or user. The above-described may be a non-limiting example of one step in the torque allocation process. Torque allocation process may be similar, or the same process as described above with the torque limits adjusted for inertia compensation. Controller 112 may be disposed fully or partially within mixer any mixer as disclosed herein. Controller 112 may include one or more computing devices as described herein. Controller 112 also receives at least a vehicle torque limit represented by an imaginary box plotted within the pitch and lift axes, which may be the same as, or similar to at least a vehicle torque limit. Here instead of the box being made of straight linear sides, the inertia compensation as previously discussed creates curved limits, wherein certain plurality of attitude commands may be allowed whereas without inertia compensation they would be outside of the limits. Where the pitch command and lift command intersect may be the initial vehicle torque signal, which may be the same or similar to initial vehicle torque signal as disclosed in the entirety of this disclosure. Controller 112 utilizes prioritization data as described in the entirety of this disclosure to solve this two-dimensional problem by preserving the higher priority command and sacrificing the lower priority command. This prioritization preservation process may be shown by the placement of modified attitude command, wherein the pitch command was preserved (horizontally translated and therefore unchanged from the initial command), while the lift command was lessened to bring the modified attitude command within vehicle torque limits (the box). Motor torque command may effectively command the amount of torque to one or more propulsors to accomplish the closest vehicle level torque to initial vehicle torque signal as possible given certain limits, maneuvers, and aircraft conditions. Modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. In a non-limiting embodiment, remaining vehicle torque may be displayed to a pilot or user.

With continued reference to FIG. 1, descent instruction set 120 may include a final stage of descent. A "final stage of descent", for the purpose of this disclosure, is a final phase of landing of the aircraft. In a non-limiting embodiment, final stage of the descent instruction set 120 may include a plurality of commands for the aircraft in which the aircraft is has a zero degrees angle of attack. For example and without limitation, final stage may include only a torque allocation in which only the vertical propulsors are outputting torque. Final stage may include a rollout phase.

With continued reference to FIG. 1, controller 112 may be configured to store the plurality of measured flight data 108 in a descent database 128 and store the descent instruction set 120 in the descent database 128. Descent database 128 may include any database configured to store and retrieve a plurality of data. In a non-limiting embodiment, controller 112 may generate a descent instruction set 124 as a function of a machine-learning model. Controller 112 may be configured to retrieve a descent training set from the descent database 128 based on the plurality of measured flight data 108, wherein the training set contains an actuator command data correlated to an element of descent instruction data. An "element of descent instruction data," for the purpose of this disclosure, is any data describing the individual instructions and/or commands of a descent instruction set 120. An "actuator command data," may include an element of data or any datum describing the actuators of an aircraft. For example and without limitation, actuator command data may include torque information of a plurality of propulsors of the aircraft. Actuator command data may include a plurality of commands wherein the plurality of commands may include any commands as described in the entirety of this disclosure. Actuator command data may include flight component command data. Controller 112 may be configured to generate a machine-learning model, wherein the machine-learning model is configured to receive the plurality of measured flight data 108 as an input and output the descent instruction set 120 as a function of descent training set. A "descent training set," for the purpose of this disclosure, is any plurality of measured flight data 108 correlated to an element of descent instruction data. Persons skilled in the art, upon reviewing the entirety of this disclosure, will be aware of various procedures and concepts that may represent the plurality of measured flight data in the context of machine-learning models.

With continued reference to FIG. 1, descent instruction set 120 may be transmitted to a plurality of flight components 136. Flight components and control surfaces may be commanded exclusively by the pilot or by one or more users, or one or more computing devices. Flight components and control surfaces may be commanded by a pilot using a user device 132. User device 132 may include an additional computing device, such as a mobile device, laptop, desktop computer, or the like; as a non-limiting example, the user device 132 may be a computer and/or smart phone operated by a pilot-in-training at an airport hangar. User device 132 may include, without limitation, a display in communication with controller 112; the display may include any display as described in the entirety of this disclosure such as a light emitting diode (LED) screen, liquid crystal display (LCD), organic LED, cathode ray tube (CRT), touch screen, or any combination thereof. Output data from controller 112 may be configured to be displayed on user device 132 using an output graphical user interface. An output graphical user interface may display any output as described in the entirety of this disclosure. Flight components may be consistent with any of the flight components and/or control surfaces as described herein. "Flight components", for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow. In non-limiting embodiments, flight components may include propulsors, wings, rotors, propellers, pusher propellers, ailerons, elevators, stabilizers, stabilators, and the like, among others.

Figure 2:
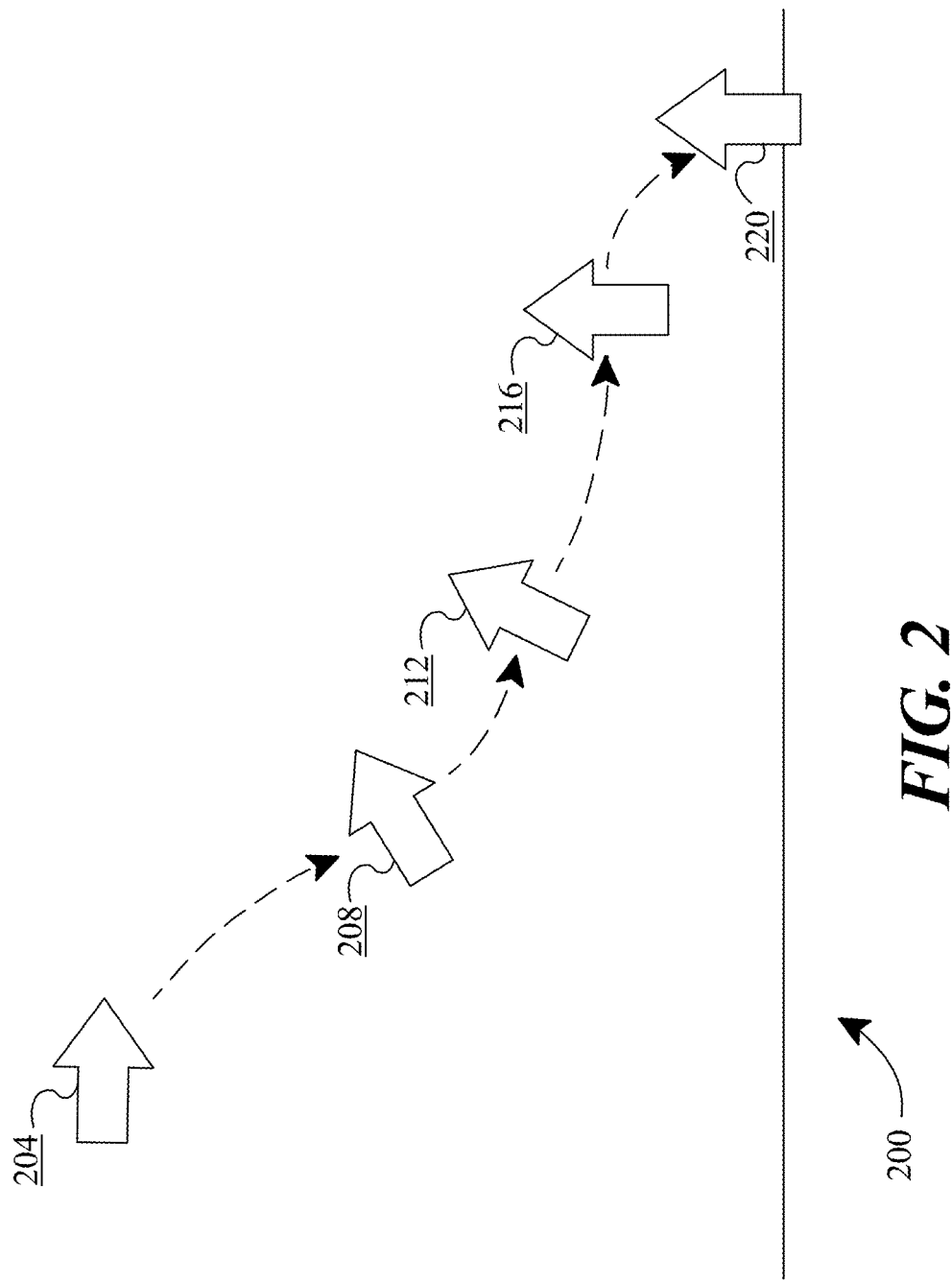
FIG. 2 is an illustration of an exemplary embodiment of an enactment of wing positioning of an aircraft transitioning from fixed wing flight vertical wing flight for landing.

Now referring to FIG. 2, an illustration of an exemplary embodiment of an enactment 200 of net thrust angle of the propulsion system of an aircraft transitioning from fixed wing flight vertical wing flight for landing is provided. In position 204 descent has not started. In position 204, the forward propulsor are producing an increased amount of torque in forward flight while the vertical propulsors are outputting a minimal amount of torque to maintain a constant altitude and a low angle of attack. In a non-limiting embodiment, the beginning stage of descent may be triggered based on a pilot input. Controller 112 may determine when to begin descent based on a target landing location. Controller 112 may instruct the aircraft to maintain a dive or initial descent position for the majority of the landing approach. Prior to descent, the vertical propulsors of an aircraft may be in a neutral position. In the beginning stage of descent, the controller 112 may instruct vertical propulsors to decrease their torque output. As descent begins, the vertical propulsors begin to decrease its torque output to reduce the altitude and approach a landing location in position 208. In a non-limiting embodiment, a front pair of vertical propulsors that are coupled closer to the front of the aircraft may output significantly more torque than the pair of vertical propulsors to achieve a high angle of attack. In a non-limiting embodiment, forward propulsors may still output torque in a decreasing amount to provide some lift to the aircraft as it slowly descends to the landing location. The combination of wing and rotor lift with some forward speed may be able to support the vehicle down to a low landing speed. Below the low landing speed, gravity may cause the aircraft to fall towards ground. The aircraft may apply a large amount of power to slow the aircraft as it falls, allowing the aircraft to slowly accelerate towards the ground in an arc. The trajectory of speed, control inputs, and altitude may be optimized to allow the aircraft to touch down accurately in a planned position. As initial descent begins, the vertical propulsors are increasing its torque output to reduce the descent speed of the aircraft in position 212. In a non-limiting embodiment, forward propulsor may be increasing its rate of decrease in torque output in position 212. The nose of the aircraft may be sharply angled away from ground. The aircraft may be in a full upwards tilt position, e.g. tilted as far as the aircraft controls or actuators allow. The trajectory of the aircraft may allow it to slow down before touching down. The surface of the wings may provide drag that aids in slowing the aircraft. The rotors vertical propulsors be powered at maximum power, pulling the aircraft backwards and away from ground. When a power surge is applied to slow down the aircraft, the vertical propulsors are each outputting the same amount of torque to maintain an upright position in position 216. In a non-limiting embodiment, forward propulsors may be acting on a minimum to adjust the direction of the aircraft to the landing location. In position 220, the aircraft has achieved and completed its final stage of descent. In a non-limiting embodiment, the forward propulsor may be turned off and the vertical propulsors may still be operating to slowly land on the landing location. In a non-limiting embodiment, in position 220, in a final stage of descent, the aircraft may be incapable of generating enough lift to counteract gravity. The aircraft may generate an amount of lift that helps slow the descent of the aircraft. Wings of the aircraft may be stalled while also producing a lift factor that slows down the aircraft. The wings may produce attached lift. The aircraft may set down as the attached lift dies out. In the final stage of descent, abortion of the final stage of descent may be impossible. In some embodiments, the aircraft has a thrust to weight ratio of 1 or greater before the final stage of descent. The aircraft may have a thrust to weight ratio of less than 1 but substantially close to 1 (e.g. 0.9) during the final stage of descent.

Figure 3:
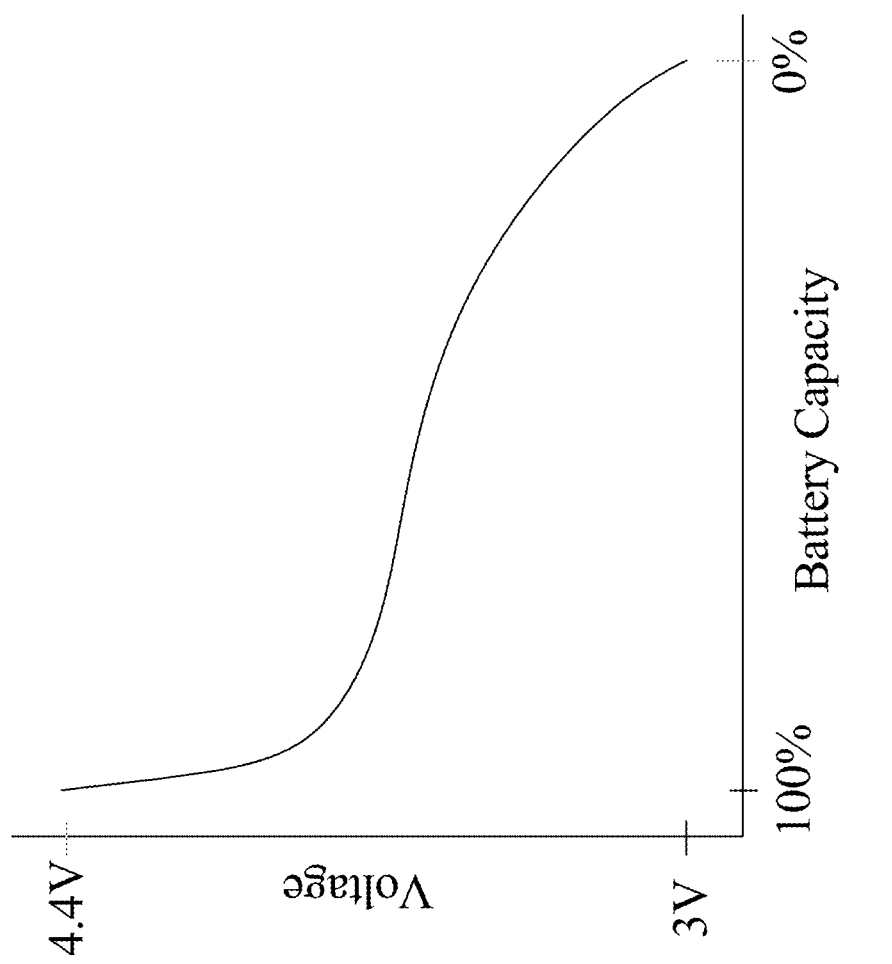
FIG. 3 is an illustration of an exemplary embodiment of an aircraft's battery discharge curve during the transition of fixed wing flight to vertical wing flight for landing.

Now referring to FIG. 3, an illustration of an exemplary embodiment of an aircraft's battery discharge curve 300 during the transition of fixed wing flight to vertical wing flight for landing is provided. Aircraft may be powered by one or more batteries. The one or more batteries may discharge according to the pattern shown. As shown, when 100% of the battery capacity is available, the battery provides 4.4 Volts. Towards the end of the battery's life, when around 5% of the battery capacity is available, the battery provides 3 Volts. Towards the end of a battery's charge, the voltage supplied may drop off quickly. The battery may have limited or low power capabilities when it is closed to be being fully drained. In some embodiments, a battery that powers an electric aircraft is not recharged while the aircraft is airborne. Towards the end of an aircraft's flight, the aircraft's batteries may be drained to low levels. At the low levels, the amount of power that the batteries are able to supply may be limited. Traditional landing systems may require a large amount of power. In a traditional landing system, the aircraft may hover and slowly approach ground. Hovering may induce risks of overheating the aircraft's systems, overloading the aircraft's motors, or destabilizing the aircraft. For example, an aircraft may be easily disturbed while hovering by a gust of wind. In some embodiments, the aircraft may be forced to begin descending when the batteries are 50% capacity or more in order to ensure enough battery power is available for the landing process.

Figure 4:
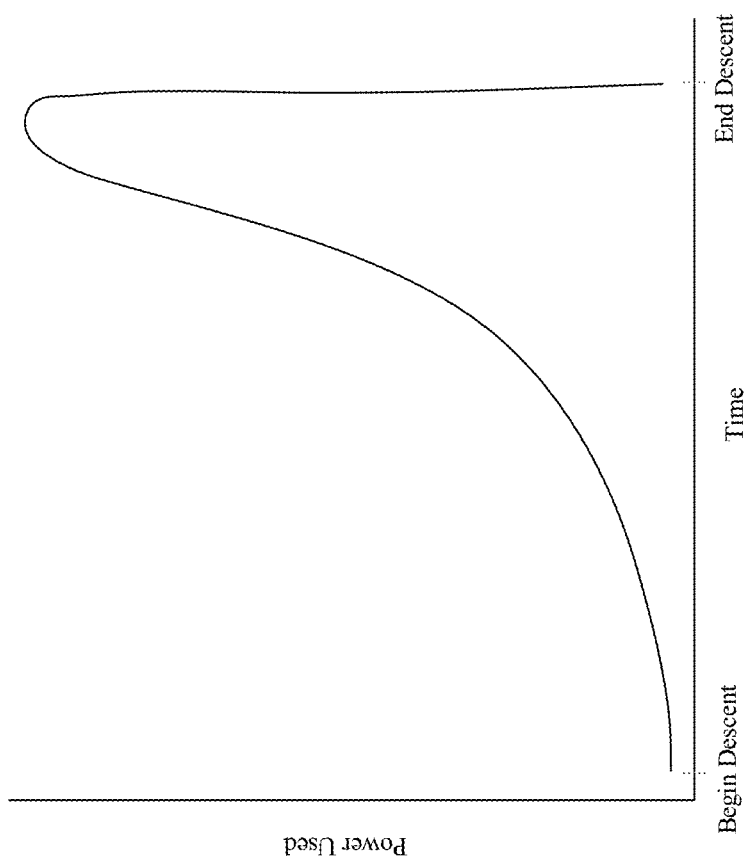
FIG. 4 is an illustration of an exemplary embodiment of power used by an aircraft during the transition of fixed wing flight to vertical wing flight for landing.

Now referring to FIG. 4, an illustration of an exemplary embodiment of power used 400 by an aircraft during the transition of fixed wing flight to vertical wing flight for landing is provided. he graph shows power used by the aircraft throughout landing. The amount of power used is low in the beginning of the landing process and spikes near the end of the landing before dropping to zero. A controller may direct an aircraft to dive until the aircraft is almost at ground. The aircraft may be in cruise while it dives down. Cruising may cool down aircraft components and safeguard against overheating. The aircraft may retain velocity in cruise and be relatively resistant to disturbances. A short distance above ground, the aircraft may be reared back at full power for a short period of time. Applying a large amount of power in a short period of time may provide less heat to the engine and other critical aircraft components than applying a lower amount of power over a long period of time as in traditional landing. In a traditional landing, the aircraft may utilize a large amount of power through the entire landing. The controller may execute a landing that conserves power overall compared to a traditionally executed landing that involves hover. The controller may allow the aircraft to fly further than a traditional landing system, because a smaller amount of battery power needs to be conserved for landing.

Figure 5:
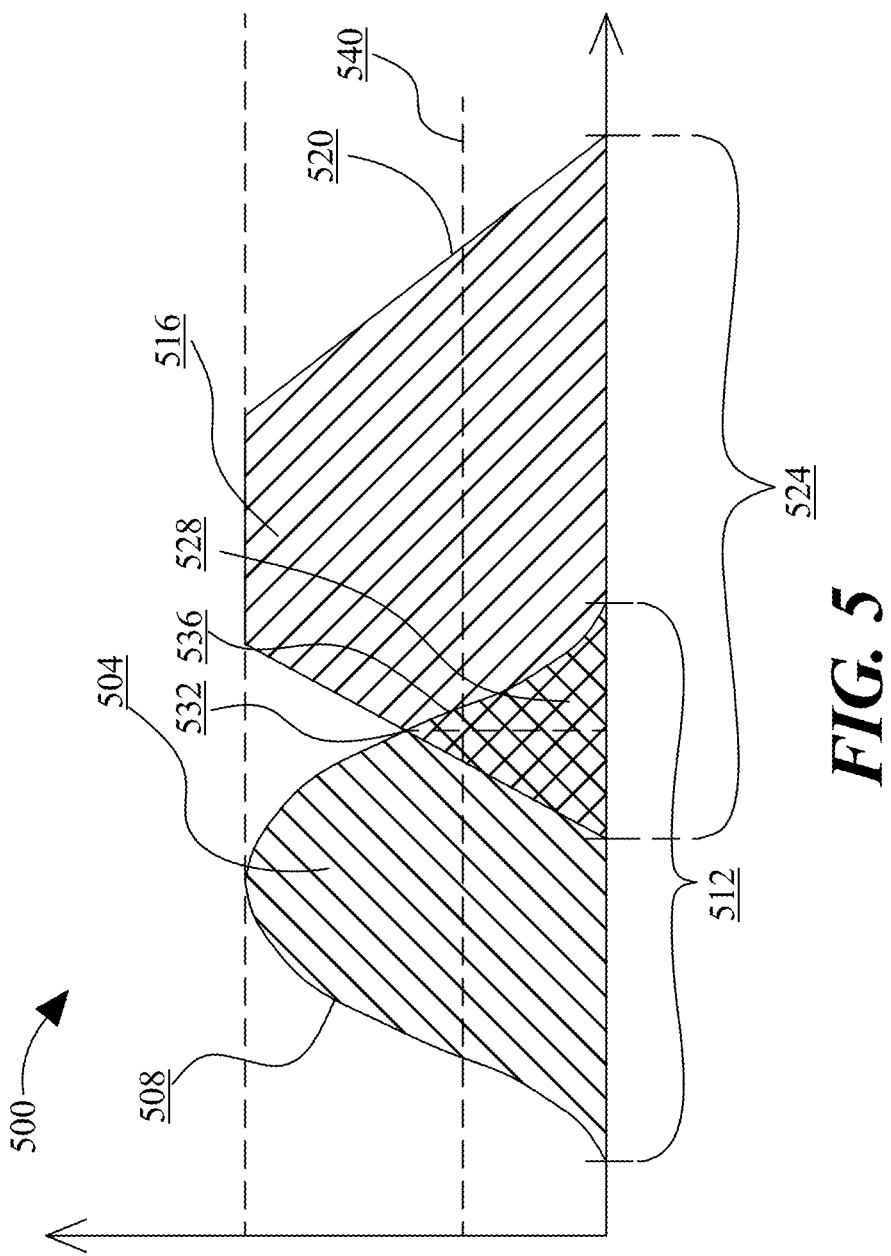
FIG. 5 is an illustration of exemplary embodiments of fuzzy sets for a differential threshold

Now referring to FIG. 5, an illustration of exemplary embodiments of fuzzy sets for a differential threshold is provided. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0, I], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as $$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 504 may represent any value or combination of values as described above, including predictive prevalence value, probabilistic outcome, any resource datum, any niche datum, and/or any combination of the above. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 328 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between a maximum distance and a minimum distance an aircraft may begin a descent within. Each threshold may be determined using training data that correlates the descent threshold and the plurality of measured flight data as a function of a machine-learning model.

Figure 6:
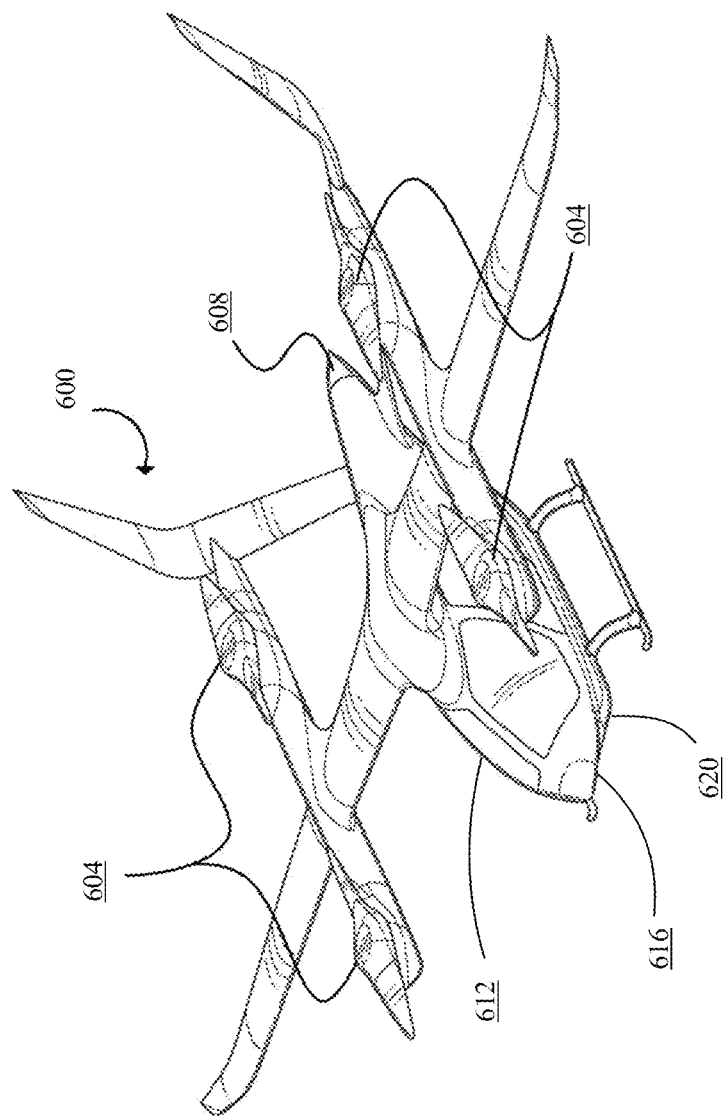
FIG. 6 is a schematic representation of an exemplary electric vertical take-off and landing vehicle.

Referring now to FIG. 6, an exemplary embodiment of an aircraft 600 is illustrated. Aircraft 600 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 6, aircraft 600 may include a fuselage 604. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 604 may comprise structural elements that physically support the shape and structure of an aircraft. Structural elements may take a plurality of forms, alone or in combination with other types. Structural elements may vary depending on the construction type of aircraft and specifically, the fuselage. Fuselage 604 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 6, aircraft 600 may include a plurality of actuators 608. In an embodiment, actuator 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 6, a plurality of actuators 608 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 608 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 608 may include a rudder, which may include, without limitation, a segmented rudder that produces a torque about a vertical axis. Additionally or alternatively, plurality of actuators 608 may include other flight control surfaces such as propulsors, rotating flight controls, or any other structural features which can adjust movement of aircraft 600. plurality of actuators 608 may include one or more rotors, turbines, ducted fans, paddle wheels, and/or other components configured to propel a vehicle through a fluid medium including, but not limited to air.

Still referring to FIG. 6, plurality of actuators 608 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. Propulsor may include a forward propulsor. In a non-limiting embodiment, pusher component may include a forward propulsor. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 6, propulsor may include a propeller, a blade, or any combination of the two. A propeller may function to convert rotary motion from an or other power source into a swirling slipstream which may push the propeller forwards or backwards. Propulsor may include a rotating power-driven hub, to which several radial airfc>il-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 6.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 6.3° inward, wherein propulsor component may be rotated and/or shifted to a second angle of 1.7° outward.

Still referring to FIG. 6, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 6, plurality of actuators 608 may include power sources, control links to one or more elements, fuses, and/or mechanical couplings used to drive and/or control any other flight component. Plurality of actuators 608 may include a motor that operates to move one or more flight control components and/or one or more control surfaces, to drive one or more propulsors, or the like. A motor may be driven by a motor drive, such as without limitation a direct current (DC) electric power and may include, without limitation, brushless DC electric motors, switched reluctance motors, induction motors, or any combination thereof. Alternatively or additionally, a motor drive may include an inverter. A motor drive may also include electronic speed controllers, inverters, or other components for regulating motor speed, rotation direction, and/or dynamic braking.

Still referring to FIG. 6, plurality of actuators 608 may include an energy source. An energy source may include, for example, a generator, a photovoltaic device, a fuel cell such as a hydrogen fuel cell, direct methanol fuel cell, and/or solid oxide fuel cell, an electric energy storage device (e.g.

a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 6, an energy source may be used to provide a steady supply of electrical power to a load over a flight by an electric aircraft 600. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 6, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 6, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 6, another exemplary actuator may include landing gear. Landing gear may be used for take-off and/or landing/Landing gear may be used to contact ground while aircraft 600 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 6, aircraft 600 may include a pilot control 612, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 608. For example and without limitation, collective control may alter and/or adjust the pitch angle of all of the main rotor blades collectively. For example, and without limitation pilot control 612 may include a yoke control. As used in this disclosure a "yoke control" is a mechanical control of an aircraft to control the pitch and/or roll. For example and without limitation, yoke control may alter and/or adjust the roll angle of aircraft 600 as a function of controlling and/or maneuvering ailerons. In an embodiment, pilot control 612 may include one or more footbrakes, control sticks, pedals, throttle levels, and the like thereof. In another embodiment, and without limitation, pilot control 612 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 600 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 600 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 6, pilot control 612 may be configured to modify a variable pitch angle. For example, and without limitation, pilot control 612 may adjust one or more angles of attack of a propeller. As used in this disclosure an "angle of attack" is an angle between the chord of the propeller and the relative wind. For example, and without limitation angle of attack may include a propeller blade angled 6.2°. In an embodiment, pilot control 612 may modify the variable pitch angle from a first angle of 2.71° to a second angle of 6.82°. Additionally or alternatively, pilot control 612 may be configured to translate a pilot desired torque for flight component 108. For example, and without limitation, pilot control 612 may translate that a pilot's desired torque for a propeller be 160 lb. ft. of torque. As a further non-limiting example, pilot control 612 may introduce a pilot's desired torque for a propulsor to be 290 lb. ft. of torque. Additional disclosure related to pilot control 612 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 6, aircraft 600 may include a loading system. A loading system may include a system configured to load an aircraft of either cargo or personnel. For instance, some exemplary loading systems may include a swing nose, which is configured to swing the nose of aircraft 100 of the way thereby allowing direct access to a cargo bay located behind the nose. A notable exemplary swing nose aircraft is Boeing 647. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 6, aircraft 600 may include a sensor 616. Sensor 616 may be configured to sense a characteristic of pilot control 612. Sensor may be a device, module, and/or subsystem, utilizing any hardware, software, and/or any combination thereof to sense a characteristic and/or changes thereof, in an instant environment, for instance without limitation a pilot control 612, which the sensor is proximal to or otherwise in a sensed communication with, and transmit information associated with the characteristic, for instance without limitation digitized data. Sensor 616 may be mechanically and/or communicatively coupled to aircraft 600, including, for instance, to at least a pilot control 612. Sensor 616 may be configured to sense a characteristic associated with at least a pilot control 612. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 616 may include at least a geospatial sensor. Sensor 616 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 100 for both critical and non-critical functions. Sensor may be incorporated into vehicle or aircraft or be remote.

Still referring to FIG. 6, in some embodiments, sensor 616 may be configured to sense a characteristic associated with any pilot control described in this disclosure. Non-limiting examples of a sensor 616 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 616 may sense a characteristic as an analog measurement, for instance, yielding a continuously variable electrical potential indicative of the sensed characteristic. In these cases, sensor 616 may additionally comprise an analog to digital converter (ADC) as well as any additionally circuitry, such as without limitation a Whetstone bridge, an amplifier, a filter, and the like. For instance, in some cases, sensor 616 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 600, for instance without limitation a computing system, a pilot display, and a memory component. Alternatively or additionally, sensor 616 may sense a characteristic of a pilot control 612 digitally. For instance in some embodiments, sensor 616 may sense a characteristic through a digital means or digitize a sensed signal natively. In some cases, for example, sensor 616 may include a rotational encoder and be configured to sense a rotational position of a pilot control; in this case, the rotational encoder digitally may sense rotational "clicks" by any known method, such as without limitation magnetically, optically, and the like.

Still referring to FIG. 6, electric aircraft 600 may include at least a motor 624, which may be mounted on a structural feature of the aircraft. Design of motor 624 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 624 may include two main holes in top and bottom of mounting area to access bearing cartridge. Further, a structural feature may include a component of electric aircraft 600. For example, and without limitation structural feature may be any portion of a vehicle incorporating motor 624, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 608. Persons skilled in the art, upon reviewing the entirety of this disclosure, will be aware of various materials, combinations of materials, and/or constructions techniques.

Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on electric aircraft 600 during flight may include, without limitation, thrust, the forward force produced by the rotating element of the electric aircraft 900 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor 608 of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of electric aircraft 600, including without limitation propulsors and/or propulsion assemblies. In an embodiment, motor 624 may eliminate need for many external structural features that otherwise might be needed to join one component to another component. Motor 624 may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Figure 7:
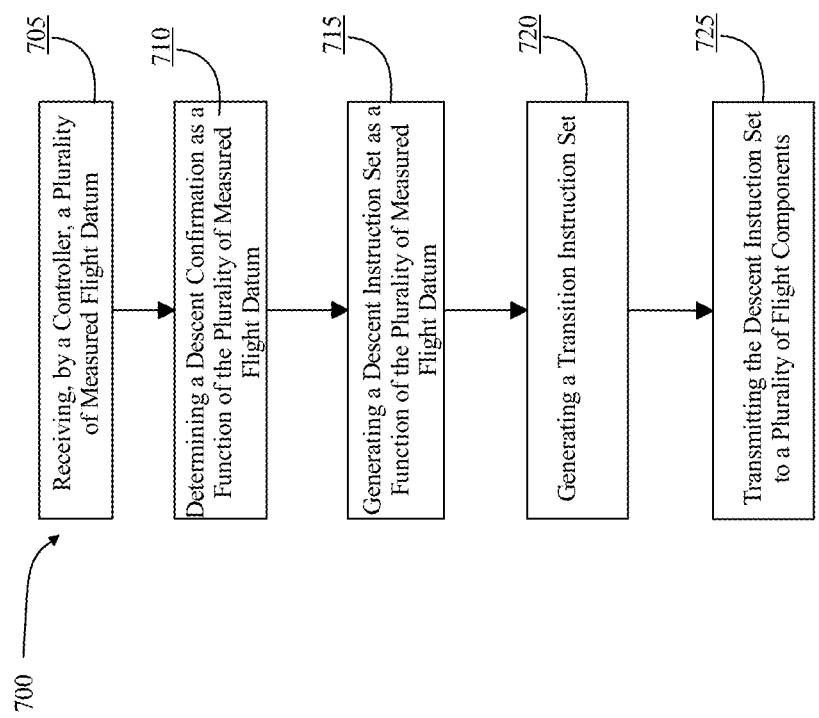
FIG. 7 is a flow diagram of an exemplary method for fixed wing flight to vertical wing flight for landing an aircraft.

Now referring to FIG. 7, a flow diagram of an exemplary method 700 for fixed wing flight to vertical wing flight for landing an aircraft is provided. Method 700, at step 705 includes receiving, by a controller, a plurality of measured flight data. Measured flight datum may include any measured flight datum as described herein. In a non-limiting embodiment, measured flight datum may include a pilot input. In a non-limiting embodiment, measured flight datum may include a manual pilot control. In a non-limiting embodiment, receiving the plurality of measured flight data may include receiving from a sensor. Sensor may include any sensor as described herein. In a non-limiting embodiment, controller may include a physical CAN bus unit. In a non-limiting embodiment, sensor may include a physical CAN bus unit. Physical CAN bus unit may include any physical CAN bus unit as described herein. In a non-limiting embodiment, controller may receive the plurality of measured flight data as a function of a plurality of physical CAN bus units.

With continued reference to FIG. 7, method 700, at step 710, includes determining a descent confirmation as a function of the plurality of measured flight data. Descent confirmation may include any descent confirmation as described herein. In a non-limiting embodiment, descent confirmation may be determined as a function of a descent threshold. Descent threshold may include any descent threshold as described herein. In a non-limiting embodiment, a controller may be configured to consistently determine the descent confirmation in time intervals throughout a duration of a flight. For example and without limitation, controller may automatically check if the aircraft is nearing its approach to a landing location and perform a check to produce the descent confirmation as a function of the measured flight datum. For example and without limitation, a controller may confirm a point in flight to be the point of beginning a descent to a landing location but may modify its determination of the decent confirmation based on external factors such as, but not limited to, weather, wind speed, air traffic, air traffic control (ATC) authority, environmental obstacles and/or hazards, and/or combination thereof. In a non-limiting embodiment, controller may determine the descent confirmation in consistent intervals but may increase the frequency of the determination after completing the first half of the aircraft's flight. In a non-limiting embodiment, descent confirmation may be determined as a function of a manual input or manual pilot input by a pilot of the aircraft. In a non-limiting embodiment, descent confirmation may be determined as a function of a descent threshold. Descent threshold may include a buffer zone in which the buffer zone represents an optimal frame of flight for the aircraft to begin descending onto a landing location. Descent threshold may include an upper limit and a lower limit defining the parameters of the buffer zone. Persons skilled in the art, upon reviewing the entirety of this disclosure, will be aware of the embodiment of a buffer zone as described in the entirety of this disclosure.

With continued reference to FIG. 7, method 700, at step 715, includes generating a descent instruction set as a function of the descent confirmation and the plurality of measured flight data. Descent instruction set may include any descent instruction set as described herein. In a non-limiting embodiment, descent instruction set may include a plurality of actuator commands that may be generated automatically wherein the plurality of actuator commands may be modified and altered as a function of the measured flight datum and/or manual pilot input. In a non-limiting embodiment, controller may be configured to perform the descent instruction set automatically at the positive determination of the descent confirmation and land the aircraft. In a non-limiting embodiment, controller may generate the descent instruction set in which the descent instruction set is configured to be followed and commanded manually by an aircraft pilot. Descent instruction set may include a plurality of commands for acceleration and braking of aircraft actuators. In a non-limiting embodiment, descent instruction set may include a plurality of unique commands assigned to each vertical propulsor of the aircraft and a forward propulsor of the aircraft. Descent instruction set may include a beginning stage. Beginning stage may include any beginning stage as described herein. Beginning stage may include a distance above the surface the aircraft should maintain to initiate the descent. Beginning stage may include a minimum and maximum speed the aircraft may command in the initiation of the descent. Beginning stage may include a distance the aircraft is required to cover to achieve a proper descent. For example and without limitation, controller may generate the distance required for descent using a formula and a function of a supervised machine-learning algorithm. In a non-limiting embodiment, beginning stage may include distance required for the aircraft to cover in its descent to be three times the height of the aircraft wherein the height includes the distance from the aircraft perpendicular to the surface. For example and without limitation, height may include a height of 1,500 feet and the distance the aircraft is required to have to properly descent may include a height of roughly 4,500 feet. In a non-limiting embodiment, the general formula for calculating the distance required in the beginning stage may include considerations of, but not limited to, tailwind, induced drag, and the like thereof. For example and without limitation, tailwind during the beginning stage may include speeds of 5 knots to 20 knots and add several hundred feet to the distance required. Beginning stage may include an angle of attack the aircraft must command in the initial phase of a descent. For example and without limitation, aircraft may be instructed to dive at an angle 30 degrees and hold a constant speed of 70 miles per hour until it reaches a following stage of descent. In a non-limiting embodiment, in the beginning stage of descent, controller may instruct the aircraft to dive or to approach at a stabilized speed and descent angle with low, none, or negative power consumption. Beginning stage may include the aircraft to be angled towards ground. The aircraft may utilize minimal amounts of power in the beginning stage of descent. In some embodiments, a plurality of actuators may be capable of substantially more power over very short time periods, possibly up to double of steady-state power for a few seconds. In the beginning stage of descent, descent through blown windborne flight may be used to reduce motor load during the initial transition from forward flight to hover to reduce the time and the initial heating of the power system prior to the final use of power at extremely low speeds. For example, a vehicle may use half of hover power to generate lift at a 7 m/s forward flight speed. Persons skilled in the art, upon reviewing the entirety of this disclosure, will be aware of the various configurations of an aircraft in the context of initial phase of descent as described in the entirety of this disclosure. Descent instruction set may include a final stage of descent. Final stage may include any final stage as described herein. In a non-limiting embodiment, final stage of the descent instruction set may include a plurality of commands for the aircraft in which the aircraft is has a zero degrees angle of attack. For example and without limitation, final stage may include only a torque allocation in which only the vertical propulsors are outputting torque. Final stage may include a rollout phase.

With continued reference to FIG. 7, step 715 may include the controller to be configured to store the plurality of measured flight data in a descent database and store the descent instruction set in the descent database. Descent database may include any database configured to store and retrieve a plurality of data. In a non-limiting embodiment, controller may generate a descent instruction set as a function of a machine-learning model. Controller may be configured to retrieve a descent training set from the descent database based on the plurality of measured flight data, wherein the training set contains an actuator command data correlated to an element of descent instruction data. For example and without limitation, actuator command data may include torque information of a plurality of propulsors of the aircraft. Actuator command data may include a plurality of commands wherein the plurality of commands may include any commands as described in the entirety of this disclosure. Actuator command data may include flight component command data. Controller may be configured to generate a machine-learning model, wherein the machine-learning model is configured to receive the plurality of measured flight data as an input and output the descent instruction set as a function of descent training set. Persons skilled in the art, upon reviewing the entirety of this disclosure, will be aware of various procedures and concepts that may represent the plurality of measured flight data in the context of machine-learning models With continued reference to FIG. 7, method 700, at step 720, includes generating a transition instruction set. Transition instruction set may include any transition instruction set as described herein. Transition instruction set may include a plurality of commands for the actuators of the aircraft. In a non-limiting embodiment, transition instruction set may include a plurality of commands instructing the vertical propulsors and forward propulsors to output torque in tandem to properly descend to a landing location. In a non-limiting embodiment, transition instruction may be subject to alterations based on new measured flight datum and/or manual pilot inputs. In a non-limiting embodiment, transition instruction set may include a command that instructs the vertical propulsors to increase its torque output and lower its forward propulsor torque output, which may result in an increased angle of attack and the angle of the aircraft wings and/or nose. In a non-limiting embodiment, controller may perform a transition of a fixed-wing flight to vertical-wing flight as a function of the transition instruction set. In a non-limiting embodiment, transition instruction set may include each propulsor alternating its level of torque output to maintain a high angle of attack and speed of the aircraft to approach a landing location of the aircraft. In a non-limiting embodiment, transition instruction set may include a plurality of commands for the vertical propulsors and forward propulsor to achieve an optimally efficient landing. Optimally efficient landing may include a landing in which power consumption is kept to a minimum without destabilizing the overall landing of the aircraft and transitioning of the aircraft from fixed-wing flight to vertical-wing flight. For example and without limitation, transition instruction set 124 may include a plurality of commands in which vertical propulsors and forward propulsor are activated mutually exclusively to avoid a high battery consumption as a result of all propulsors outputting torque at the same time continuously. For example and without limitation, plurality of commands may include short bursts of torque output to stabilize the aircraft in its descent. Transition instruction set may include a torque allocation. Torque allocation may include any torque allocation as described herein. For example and without limitation, controller may take in commands to alter aircraft trajectory that requires a change in pitch and yaw. Controller may allocate torque to at least one propulsor (or more) that do not independently alter pitch and yaw in combination to accomplish the command to change pitch and yaw. More than one propulsor may be required to adjust torques to accomplish the command to change pitch and yaw, mixer would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure.

With continued reference to FIG. 7, generating transition instruction set may include a forward propulsor torque command. Transition instruction set may include a vertical propulsor torque command. In a non-limiting embodiment, forward propulsor torque command may include a plurality of bursts of torque output for the forward propulsor. In a non-limiting embodiment, forward propulsor torque command may include a torque allocation of a decreasing torque output for the forward propulsor as it transitions from a fixed-wing flight to vertical-wing flight. In a non-limiting embodiment, vertical propulsor torque command may include a plurality of bursts of torque output for the vertical propulsors. In a non-limiting embodiment, vertical propulsor torque command may include a torque allocation of an increasing torque output for the vertical propulsors as it transitions from a fixed-wing flight to vertical-wing flight. For example and without limitation, as the forward propulsor reduces its torque output, the vertical propulsors begin to increase its torque output. For example and without limitation, the aircraft may transition from a low angle of attack to a high angle of attack as a function of the vertical propulsor torque command and forward propulsor torque command. For example and without limitation, the aircraft may dive initially in which the wings and/or nose of the aircraft are angled at 30 degrees towards the surface and transition to 20 degrees towards the sky. Persons skilled in the art, upon reviewing the entirety of this disclosure, will be aware of the changing angles of attack in the context of landing as described in the entirety of this disclosure. Transition instruction set may be configured to solve at least an optimization problem, which may be an objective function. Controller may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; an objective function may be used by mixer to score each possible pairing. At least an optimization problem may be based on one or more objectives, as described below. Controller may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted. Solving at least an optimization problem may include performing a greedy algorithm process, where optimization may be performed by minimizing and/or maximizing an output of objective function. For instance, in non-limiting illustrative example, optimization may determine the pitch moment associated with an output of at least a propulsor based on an input.

With continued reference to FIG. 7, step 720 may include generating transition instruction set as a function of the torque allocation. Controller may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component may be relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process may be then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this may be projecting the closest possible value for the third-level attitude command (roll in this example). This process would repeat again for the third and fourth attitude components, in this non-limiting example, roll and yaw attitude control components. Since roll may be prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, pitch axis may represent the command or plurality of attitude commands inputted to controller as described herein, such as moment datum. Pitch axis may be conditioned or altered to be inputted to controller. For example, and without limitation, initial vehicle torque signal may include pitch and lift commands within plurality of attitude commands. Controller may also receive at least a moment datum, which may be represented without limitation by a box plotted within the pitch and lift axes. A point where pitch command and lift command intersect may represent initial vehicle torque signal as projected onto exemplary graph of pitch and lift axes, which may be the same or similar to initial vehicle torque signal as disclosed in the entirety of this disclosure. Controller utilizes prioritization data as described in the entirety of this disclosure to solve this two-dimensional problem by preserving the higher priority command and sacrificing the lower priority command. This prioritization preservation process may be illustrated, as a non-limiting example by placement of a modified attitude command, wherein the pitch command was preserved (horizontally translated and therefore unchanged from the initial command), while the lift command was lessened to bring the modified attitude command within vehicle torque limits (the box). The modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. The remaining vehicle torque may be displayed to a pilot or user.

With continued reference to FIG. method 700, at step 725, includes transmitting the descent instruction set to a plurality of flight components. Flight components may include any flight components as described herein. Flight components and control surfaces may be commanded exclusively by the pilot or by one or more users, or one or more computing devices. Flight components and control surfaces may be commanded by a pilot using a user device. User device may include an additional computing device, such as a mobile device, laptop, desktop computer, or the like; as a non-limiting example, the user device may be a computer and/or smart phone operated by a pilot-in-training at an airport hangar. User device may include, without limitation, a display in communication with controller; the display may include any display as described in the entirety of this disclosure such as a light emitting diode (LED) screen, liquid crystal display (LCD), organic LED, cathode ray tube (CRT), touch screen, or any combination thereof. Output data from computing device may be configured to be displayed on user device using an output graphical user interface. An output graphical user interface may display any output as described in the entirety of this disclosure.

Figure 8:
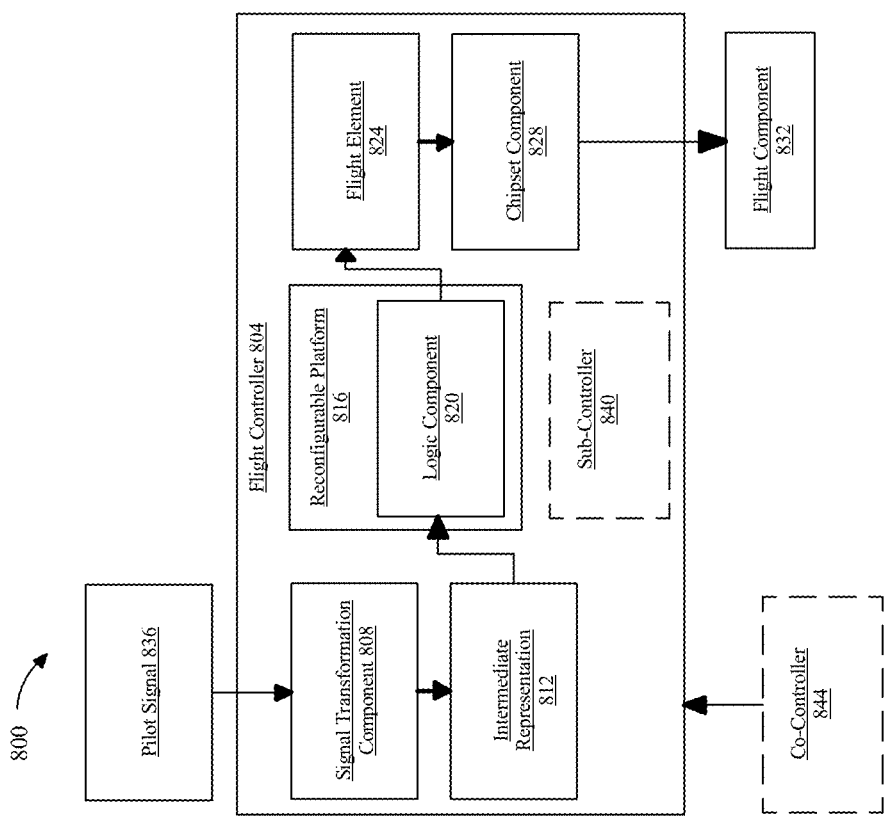
FIG. 8 is a block diagram illustrating an exemplary flight controller.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachu-setts, USA In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs Xi that may receive numerical values from inputs to a neural network containing the node and/or from other nodes. Node may perform a weighted sum of inputs using weights Wi that are multiplied by respective inputs Xi. Additionally or alternatively, a bias b may be added to the weighted sum of the inputs such that an offset is added to each unit in the neural network layer that is independent of the input to the layer. The weighted sum may then be input into a function (ƒ), which may generate one or more outputs y. Weight Wi applied to an input Xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights Wi may be determined by training a neural network using training data, which may be performed using any suitable process as described above. In an embodiment, and without limitation, a neural network may receive semantic units as inputs and output vectors representing such semantic units according to weights Wi that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
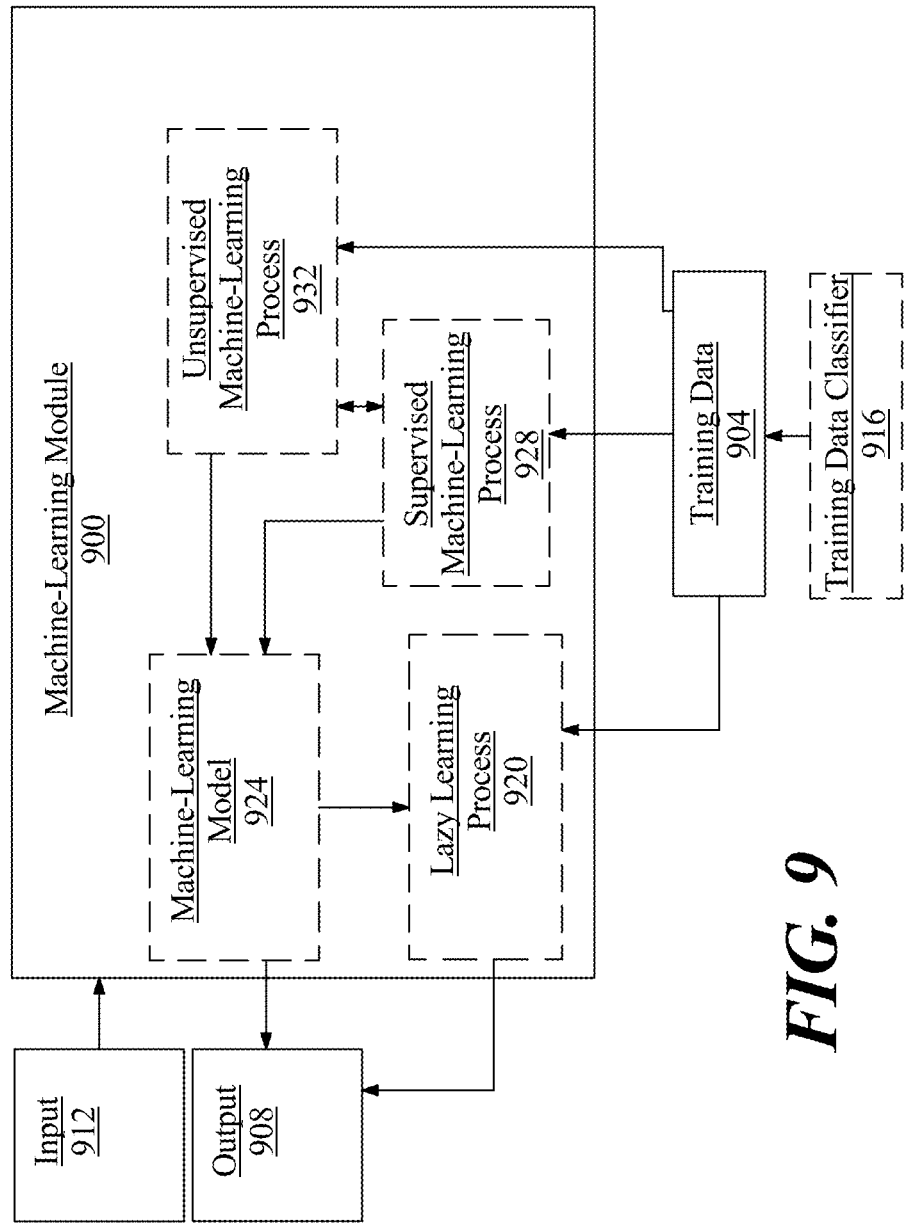
FIG. 9 illustrates a block diagram of an exemplary machine-learning process.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example a measured flight datum may be an input and a descent instruction set may be an output.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 916 may classify elements of training data to an element of actuator commands for which a subset of training data may be selected]

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy nai:ve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a measured flight datum as an input, descent instruction set as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
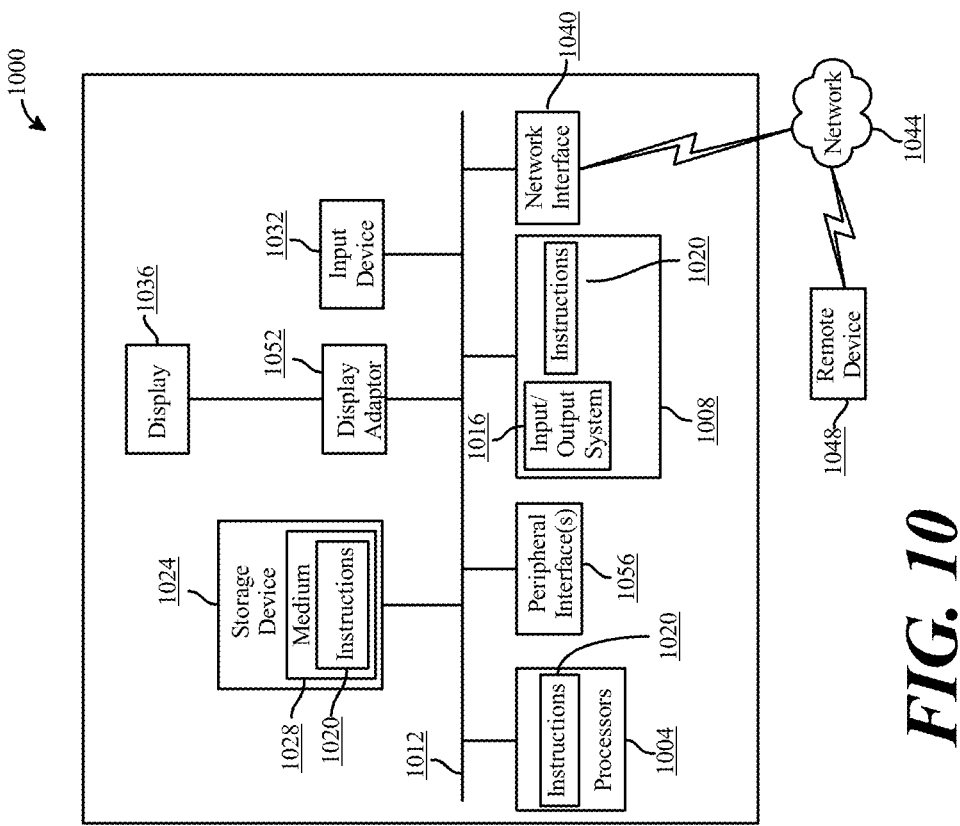
FIG. 10 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve method and, systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for landing an electric aircraft, the system comprising:
 a controller communicatively connected to at least one sensor, wherein the controller is configured to:
  receive, from the at least one sensor, a plurality of measured flight data;
  determine a descent confirmation as a function of the plurality of measured flight data; and
  generate a descent instruction set based on the descent confirmation and the plurality of measured flight data, wherein generating the descent instruction set further comprises:
   generating a transition instruction set; and
   communicating the descent instruction set to a pilot.

2. The system of claim 1, wherein the plurality of measured flight data includes a plurality of pilot inputs.

3. The system of claim 1, wherein the plurality of measured flight data further comprises at least an outside parameter.

4. The system of claim 1, wherein the descent instruction set further comprises at least beginning stage.

5. The system of claim 1, wherein the descent instruction set further comprises the transition instruction set.

6. The system of claim 1, wherein the descent confirmation is determined as a function of a descent threshold.

7. The descent threshold of claim 6, wherein the descent threshold further comprises a buffer zone.

8. The system of claim 1, wherein the controller is further configured to:
 store the plurality of measured flight data in a descent database; and
 store the descent instruction set in the descent database.

9. The system of claim 1, wherein the controller is further configured to:
 retrieve a descent training set from a descent database based on the plurality of measured flight data, wherein the descent training set contains a pilot input communicatively connected to at least a pilot control; and
 generate a machine-learning model, wherein the machine-learning model is configured to receive the plurality of measured flight data as an input and output the descent instruction set as a function of descent training set.

10. The system of claim 1, wherein the descent instruction set further comprises the descent confirmation.

11. A method for landing an electric aircraft, the method comprising:
 receiving, by a computing device, a plurality of measured flight data;
 determining, by the computing device, a descent confirmation as a function of the plurality of measured flight data; and
 generating, by the computing device, a descent instruction set based on the descent confirmation and the plurality of measured flight data, wherein generating the descent instruction set further comprises:
  generating a transition instruction set; and
  transmitting, by the computing device, the descent instruction set a pilot.

12. The method of claim 11, wherein the plurality of measured flight data includes a plurality of pilot inputs.

13. The method of claim 11, wherein the plurality of measured flight data further comprises at least an outside parameter.

14. The method of claim 11, wherein the descent instruction set further comprises at least beginning stage.

15. The method of claim 11, wherein the descent instruction set further comprises the transition instruction set.

16. The method of claim 11, wherein the descent confirmation is determined as a function of a descent threshold.

17. The descent threshold of claim 16, wherein the descent threshold further comprises a buffer zone.

18. The method of claim 11, further comprising:
 storing the plurality of measured flight data in a descent database; and
 storing the descent instruction set in the descent database.

19. The method of claim 11, further comprising:
 retrieving a descent training set from a descent database based on the plurality of measured flight data, wherein the descent training set contains a pilot input communicatively connected to at least a pilot control; and
 generating a machine-learning model, wherein the machine-learning model is configured to receive the plurality of measured flight data as an input and output the descent instruction set as a function of the descent training set.

20. The method of claim 11, wherein the descent instruction set further comprises the descent confirmation.

* * * * *